United States Patent [19]

Lamparter

[11] Patent Number: 5,719,553
[45] Date of Patent: Feb. 17, 1998

[54] SEALED ELECTRICAL ACTUATOR ASSEMBLY FOR HINGED VEHICLE SAFETY DEVICES

[75] Inventor: Ronald C. Lamparter, Grosse Pointe Shores, Mich.

[73] Assignee: Transpec Inc., Troy, Mich.

[21] Appl. No.: 654,680

[22] Filed: May 29, 1996

[51] Int. Cl.$^6$ ............................................. B60Q 1/26
[52] U.S. Cl. ................................... 340/433; 116/28 R
[58] Field of Search ......................... 340/433, 425.5, 340/480, 487, 490; 116/63 R, 28 R; 180/271; 293/117; 318/282, 434

[56] References Cited

U.S. PATENT DOCUMENTS

| | | | |
|---|---|---|---|
| 4,138,668 | 2/1979 | Latta, Jr. et al. | 340/130 |
| 4,339,744 | 7/1982 | Latta, Jr. | 340/433 |
| 4,559,518 | 12/1985 | Latta, Jr. | 340/130 |
| 4,766,413 | 8/1988 | Reavell | 340/130 |
| 4,816,804 | 3/1989 | Reavell | 340/433 |
| 4,916,372 | 4/1990 | Reavell et al. | 116/28 R |
| 4,956,630 | 9/1990 | Wicker | 116/28 R |
| 4,983,949 | 1/1991 | Wicker | 340/433 |
| 5,036,307 | 7/1991 | Reavell et al. | 340/487 |
| 5,132,662 | 7/1992 | Burch | 340/433 |
| 5,166,663 | 11/1992 | Leis | 340/433 |
| 5,199,754 | 4/1993 | Freeman | 293/117 |
| 5,357,239 | 10/1994 | Lamparter | 340/433 |
| 5,406,250 | 4/1995 | Reavell et al. | 340/433 |
| 5,406,251 | 4/1995 | Leis | 340/433 |

*Primary Examiner*—Jeffery Hofsass
*Assistant Examiner*—John Tweel, Jr.
*Attorney, Agent, or Firm*—Reising, Ethington, Barnard & Perry

[57] ABSTRACT

A school bus has a stop sign hinged on a sealed electrical actuator assembly that is attached to the side of the bus. The actuator assembly includes the electrical and mechanical components including an electric motor that pivot the hinged stop sign from a stored position adjacent the bus to an operative position extending outwardly of the bus in perpendicular fashion and back to the stored position. These components and wiring harnesses are protected in an outer sealed housing that has a removable cover to facilitate installation and repair. Installation and repair is further enhanced by a removable inner housing sub-assembly that carries a motor control circuit for the electric motor and provides additional protection for the electric motor. The school bus also has a crossing arm hinged on an identical sealed electrical actuator assembly, that is attached to the front bumper of the bus near the passenger door.

17 Claims, 3 Drawing Sheets

SEALED ELECTRICAL ACTUATOR ASSEMBLY FOR HINGED VEHICLE SAFETY DEVICES

TECHNICAL FIELD

This invention relates to vehicle safety devices and more particularly to electrical actuator assemblies for pivoting vehicle safety devices such as stop signs and crossing arms that are hinged on school busses.

BACKGROUND ART

U.S. Pat. No. 5,357,239 granted to me Oct. 18, 1994 discloses an actuating device for safety devices such as safety gates and stop signs that are pivotally mounted on school busses. The actuating device comprises a housing and a bracket that is pivotally mounted to the housing. The bracket is pivoted by an electric motor that acts through a gear reduction unit, a drive member, a torsion spring and a spring engager. The electric motor is disposed in the housing along an electronic control circuit that includes wiring harnesses, relays and limit switches.

Improved stop signs and safety gates (also known as crossing arms) are disclosed in my pending U.S. patent application Ser. No. 08/525,119 filed Sep. 8, 1995 for an Illuminated Housing Assembly; Ser. No. 08/525,115 filed Sep. 8, 1995 for an Illuminated Pivotal Sign Assembly; and Ser. No. 08/525,120 filed Sep. 8, 1995 for a Stop Sign Housing with Flashing Lights.

DISCLOSURE OF INVENTION

The object of this invention is to provide an improved electrical actuator assembly for pivoting vehicle safety devices such as stop signs and crossing arms including those disclosed in my pending patent applications cited above.

A feature of the invention is that the electrical and mechanical components for pivoting the vehicle safety device are enclosed in a compact, sealed, tamper proof housing that protects the components from vandalism and adverse weather conditions.

Another feature of the invention is that the electrical actuator assembly has a compact sealed outer housing that encloses electrical and mechanical components for pivoting the vehicle safety device including an electric motor and a motor control circuit.

Another feature of the invention is that the electrical actuator assembly has a sealed outer housing that has a removable cover that is accessible for easy removal to facilitate installation or repair of the safety device and/or the actuator assembly.

Still another feature of the invention is that the electrical actuator assembly has a removable inner sub-assembly to facilitate installation or repair of the safety device and/or the actuator assembly.

Still yet another feature of the invention is that the electrical actuator assembly has a removable inner sub-assembly that holds an electric motor and a motor control circuit to facilitate installation and repair.

Still yet another feature of the invention is that the electrical actuator assembly has a removable inner housing that provides additional protection for an electric motor and a gear reduction unit for an electric motor.

Still yet another feature of the invention is that electrical actuating assembly has an outer housing that is equipped to route wiring harnesses directly out of the outer housing and into the bus so that wiring harnesses of a motor control circuit are not exposed to vandalism or adverse weather conditions.

Still yet another feature of the invention is that electrical actuating assembly has an outer housing that is equipped to route wiring harnesses from the safety device through the outer housing and directly into the bus so that wiring harnesses of the safety device are not exposed to vandalism or adverse weather conditions.

BRIEF DESCRIPTION OF THE DRAWINGS

The above and other objects, features and advantages of the invention will become more apparent from the following description taken in conjunction with the accompanying drawings wherein like references refer to like parts and wherein.

BEST MODE(S) FOR CARRYING OUT THE INVENTION

Figure 1:
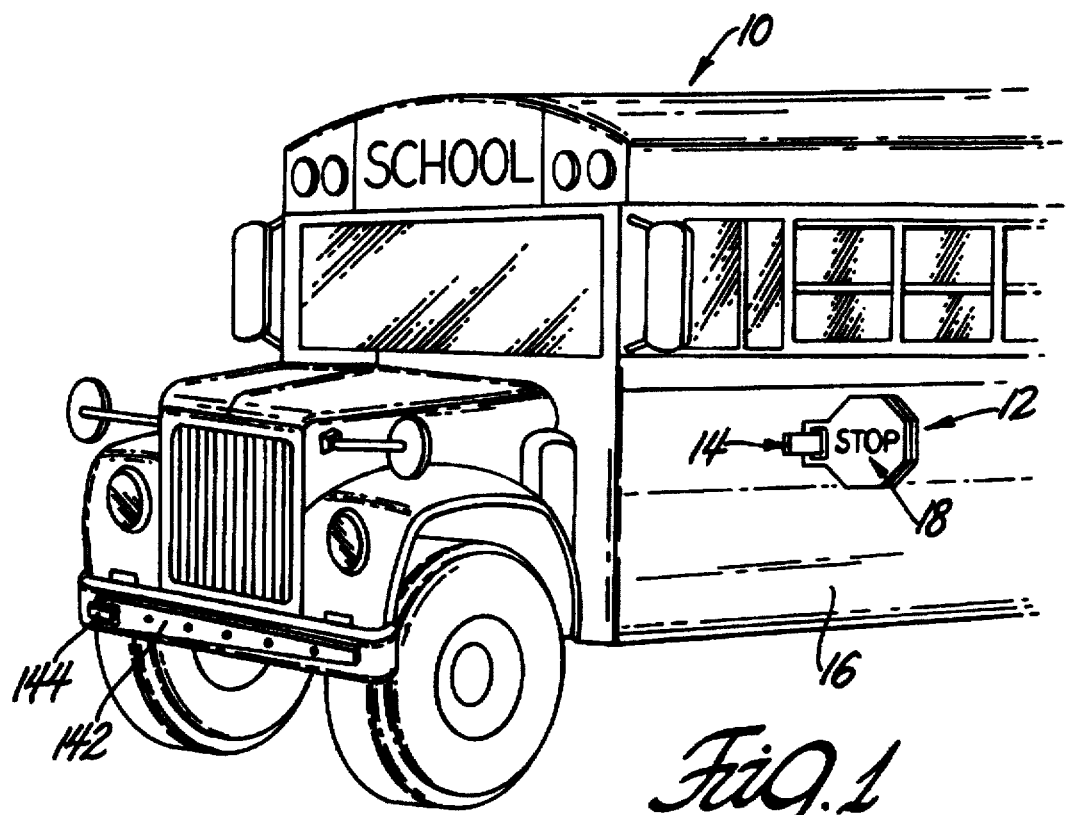
FIG. 1 is a perspective view of a school bus equipped with a hinged stop sign and an electrical actuating assembly of the invention for pivoting the hinged bus sign and a hinged crossing arm and an identical actuating assembly for pivoting the crossing arm.

Referring now to the drawing, FIG. 1 shows a school bus 10 equipped with a stop sign mechanism of the invention indicated generally at 12. The stop sign mechanism 12 comprises a sealed electrical actuator assembly 14 that is secured to a side body panel 16 of the school bus 10 and a stop sign assembly 18 having integral arms that are hinged on the actuator assembly 14 for pivotal movement. The actuator assembly 14 pivots the stop sign assembly 18 between a retracted (stored) position adjacent the side 16 of the school bus 10 and an extended (operative) position where the stop sign assembly 18 extends outwardly of the bus side 16 in a perpendicular fashion as shown in FIG. 1.

The actuator assembly 14 of the invention provides a tamper proof and weather proof environment for several electrical and mechanical components including an electric motor and a motor control circuit for pivoting the stop sign 18 assembly back and forth between the stored position and the operative position.

The actuator assembly 14 has an outer box shaped housing 20 that comprises a base 22 that is secured to the body side panel 16 of the bus 10 and a removable cover 24 that is secured to the base 22. The base 22 is attached to the body side panel 16 of the bus 10 by four fasteners 26 that extend through mounting holes 28 in an elevated bottom wall 25 of the base 22. The mounting holes 28 are located outside a continuous peripheral side wall 30 of the base 22 that cooperates with the cover 24 to provide a sealed environment inside the box shaped housing 20 as explained below. The side wall 30 also extends below the elevated bottom wall 25 to seal against the body side panel 16 to provide a sealed space 27 below the bottom wall 25 when the base 22 is attached by fasteners 26.

The cover 24 has a top wall 32 that is provided with four recessed holes 33 and a continuous side wall 34 that matches the shape of the continuous side wall 30 of the base. The base side wall 30 has an upstanding outer lip 36 and the cover side wall 34 has an upstanding inner lip 38 that form a sealed overlap joint at the interface of the side walls 30 and 34 as best shown in FIG. 3.

Figure 2:
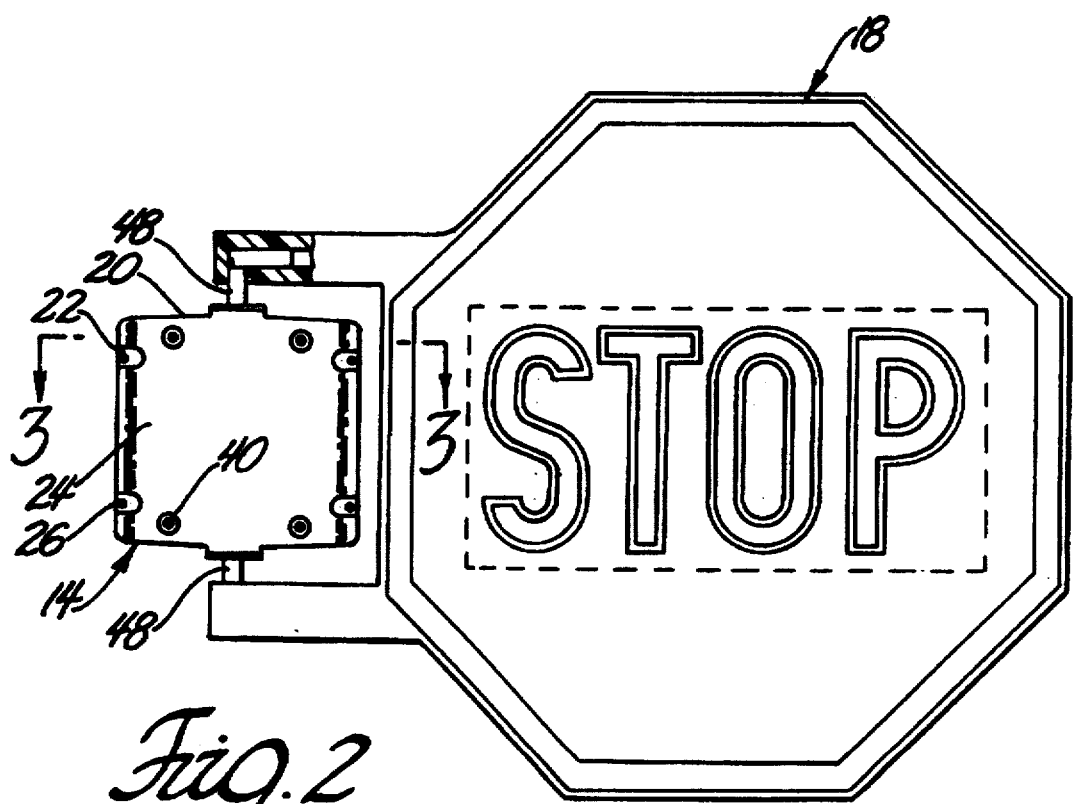
FIG. 2 is a front view of the hinged stop sign and electrical actuating assembly that is shown in FIG. 1.
Figure 3:
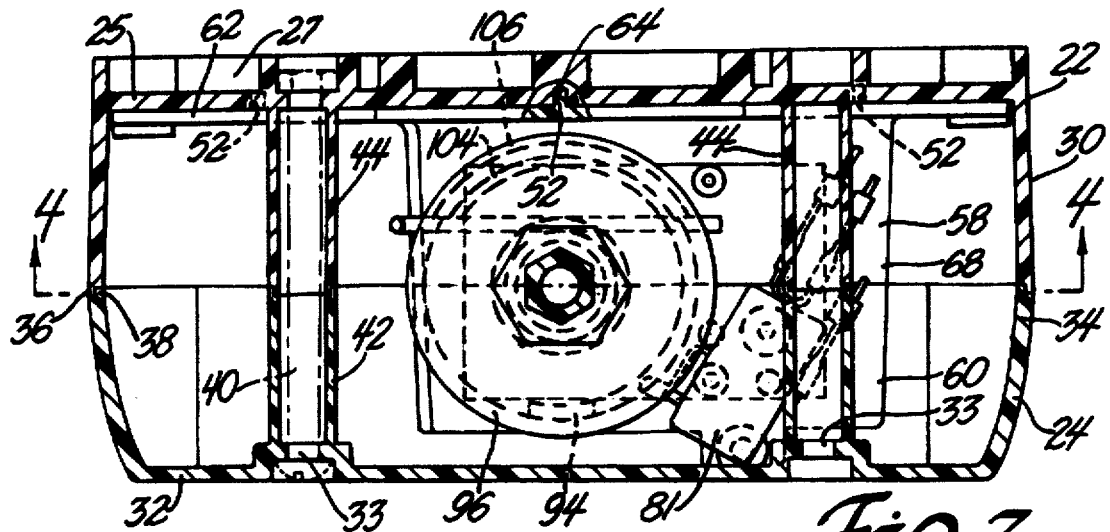
FIG. 3 is a section taken substantially along the line 3—3 of FIG. 2 looking in the direction of the arrows.

The base 22 and cover 24 are attached together by four fasteners 40 (FIG. 2) that are inserted into the recessed holes 33 (FIG. 3). The cover 24 has pendant tubes 42 aligned with the recessed holes 33 and integrated with the side wall 34. The base 22 has matching pendant tubes 44 that are integrated with its side wall 30. The tubes 42 and 44 mate end-to-end with portions of the upstanding lips 36, 38 forming a sealed overlap joint that isolates the interior of the tubes 42, 44 and the fasteners 40 from the sealed cavity inside the outer housing 20. A typical fastener 40 comprising a bolt and lock nut is shown in phantom in FIG. 3.

The base 22 and cover 24 each have two semicircular recesses 46 opposite each other in their respective side walls 30 and 34 that form two round holes for supporting two flanged brass collars 47 in the respective upper and lower side walls of the outer housing 20.

The brass collars 47 in turn receive the respective round ends of two hollow, L-shaped arms 48 to pivotally attach the stop sign assembly 18 to the actuator 14. The brass collars 47 are cradled and held in the recesses 46 of the base 22 by the recesses 46 of the cover 24. Thus the cover acts in the manner of a bearing cap so that the brass collars 47 and arms 48 can be lifted off or pulled away from the base 22 in a perpendicular direction when the cover 24 is removed.

The L-shaped arms 48 are shown and described in detail in my three pending patent applications which are identified above and which are hereby incorporated in this patent specification by reference.

One hollow arm, preferably the lower arm 48 is used to route an electrical wiring harness 49 for illuminating the stop sign assembly 18 from the stop sign assembly 18 to the interior of the actuator housing 20 while the other hollow arm, preferably the upper arm 48, is used to rotate the stop sign assembly 18 about a vertical pivot axis established by the brass collars 47. The round ends of the hollow arms 48 extend through the brass collars 47 and terminate in a hexagonal tip 50. The hexagonal tip 50 of the upper arm 48 forms a driving connection as explained below.

The housing base 22 has an elevated bottom wall that includes a knock-out 51 in each corner and a circumferential array of small pilot recesses 52 within the peripheral wall 30. One or more of the knock-outs 51 are punched out to provide a hole or holes for routing electrical wiring harnesses from the outer housing 20 into the bus as shown in the upper left hand corner of FIG. 4. The small pilot recesses 52 locate an inner sub-assembly 54 inside the outer housing 20. This inner sub-assembly 54 provides a housing and further environmental protection for an electric motor 55 and a gear reduction unit 75 and also carries a motor control circuit 57 for the electric motor 52 that is shown schematically in FIG. 7.

The inner sub-assembly 54 comprises a base member 58 and a cover member 60. The base member 58 includes a round base plate 62 that has a circumferential array comprising several pins 64 and two holes 66. The pins 64 fit into the recesses 52 to locate the subassembly 54 in the outer housing 20. The two holes 66 are used to removably attach the base plate 62 to the base 22 of the outer housing 20 with threaded fasteners 67.

The base plate 62 of the inner base member 58 has a square shaped embossment 68 that forms an L-shaped cavity 70 and a rectangular mounting pad 72 in the crotch of the L-shaped cavity 70 for mounting relays 71 and 73 that form part of the motor control circuit 57. The L-shaped cavity 70 has a rectangular portion 74 for housing the gear reduction unit 75 and a cradle portion 76 for supporting the electric motor 55.

The cover member 60 is L-shaped and hollow. One hollow leg 78 mates with the rectangular portion 74 to complete a chamber for the gear reduction unit 75. The other hollow leg 80 fits over the cradle portion 76 of the base member 58 to complete a chamber for the electric motor 55. The hollow leg 80 has two semi-circular ribs 82 and a semicircular end wall 84. The semi-circular ribs hold the electric motor against the cradle portion 76 while the semicircular end wall 84 provides an air gap as explained below. The cover member 60 also includes two bosses 77 for mounting limit switches 79, 81 that form part of the motor control circuit 57.

The mating walls of the base member 58 and the cover member 60 have outer and inner upstanding lips 86 and 88 respectively that form a sealed overlap joint when the cover member 60 is attached to the base member 58 by threaded fasteners 59 at the opposite diagonal corners of the rectangular portions that house the gear reduction unit 75.

Figure 6:
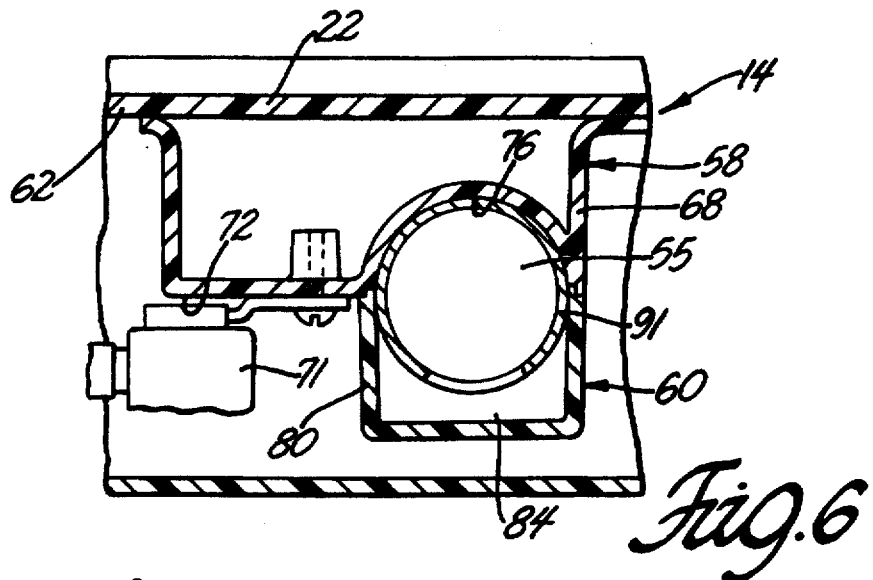
FIG. 6 is a section taken substantially along the line 6—6 of FIG. 4 looking in the direction of the arrows.

The mating walls also each have a small semicircular groove that align with each other to provide a round hole for the output shaft 90 of the gear reduction unit 75. The round hole is laterally offset from the electric motor 52 to protect the motor 52 from damage from water or other contaminants that may have worked their way into the interior chamber of the outer housing 20. The upper end of the electric motor 55 is attached to the bottom of the gear reduction unit 75 and it is disposed in a protective metal sleeve 91 that ends above the semicircular end wall 84 to provide an annular air gap between the casing of the electric motor 55 and the end wall 84 and cradle portion 76. This air gap which is partially shown in FIG. 6 by breaking away part of sleeve 91, allows air to circulate and cool the electric motor 55 inside the inner housing of sub-assembly 54.

The actuating assembly 14 also includes a drive mechanism 92 that couples the output shaft 90 of the gear reduction unit 75 to the upper arm 48 for pivoting the stop sign assembly 18. The drive mechanism 92 comprises spool-like input and output member 94 and 96 and a torsion spring 98. The input member 94 is non-rotatably attached to shaft 90 by means of mating flats on the shaft 90 and in a shaft receiving socket of the input member 94. The output member 96 is non-rotatably attached to the upper arm 48 by a hexagonal socket that receives the hexagonal tip 50. The torsion spring 98 has radial legs 100, 102 at opposite ends of a coil for engaging the input member 92 and output member 94.

The input member 94 has a hollow stem 101 that receives an axle stem of the output member 96 so that the input and output members 94 and 96 are coaxially arranged and rotate relative to each other.

Figure 5:
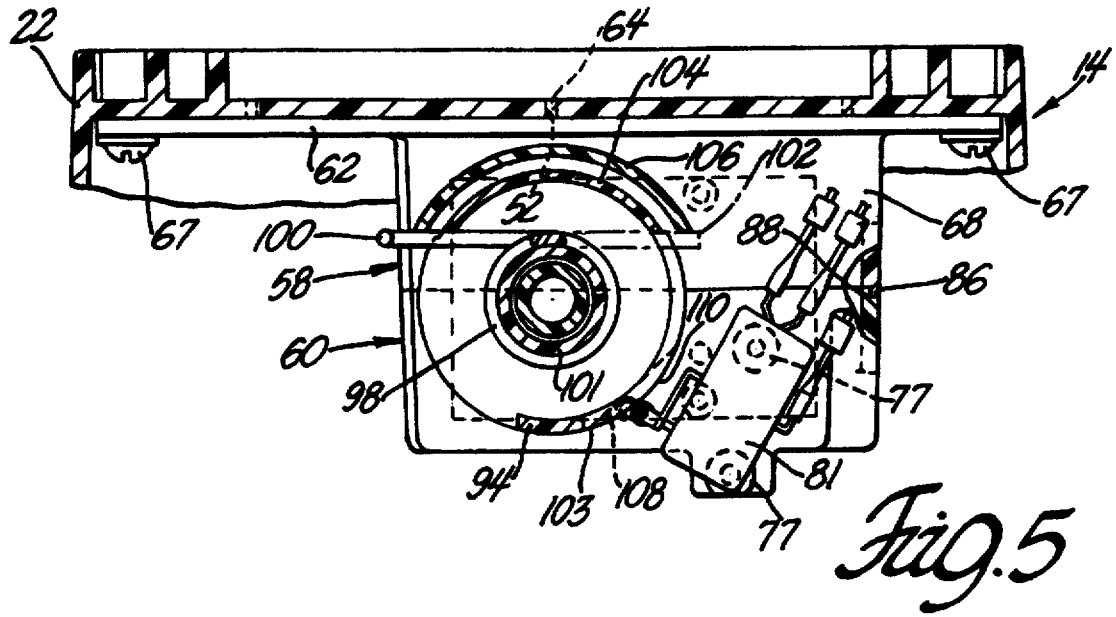
FIG. 5 is a section taken substantially along the line 5—5 of FIG. 4 looking in the direction of the arrows.

The input member 94 has a partial circumferential wall 103 that has three sections of different heights including a part circular, axial flange 104 that nests in a part circular axial flange 106 of the output member 96 as best shown in FIG. 5.

The coil torsion spring 98 is disposed loosely on the hollow stem 101 and inside the circumferential wall 103 of the input member with the radial legs 100 and 102 engaging opposite circumferential ends of the nested axial flanges 104 and 106. Thus the input member 94 drives the torsion spring 98 which in turn drives the output member 96. With this arrangement, the drive mechanism 92 normally transfers drive from the electric motor 55 to the output member 96 but allows the electric motor 55 to continue driving the input member 94 in the event that pivotal movement of the stop sign assembly 18 is halted by one reason or another during operation by storing energy in the torsion spring 98.

Figure 4:
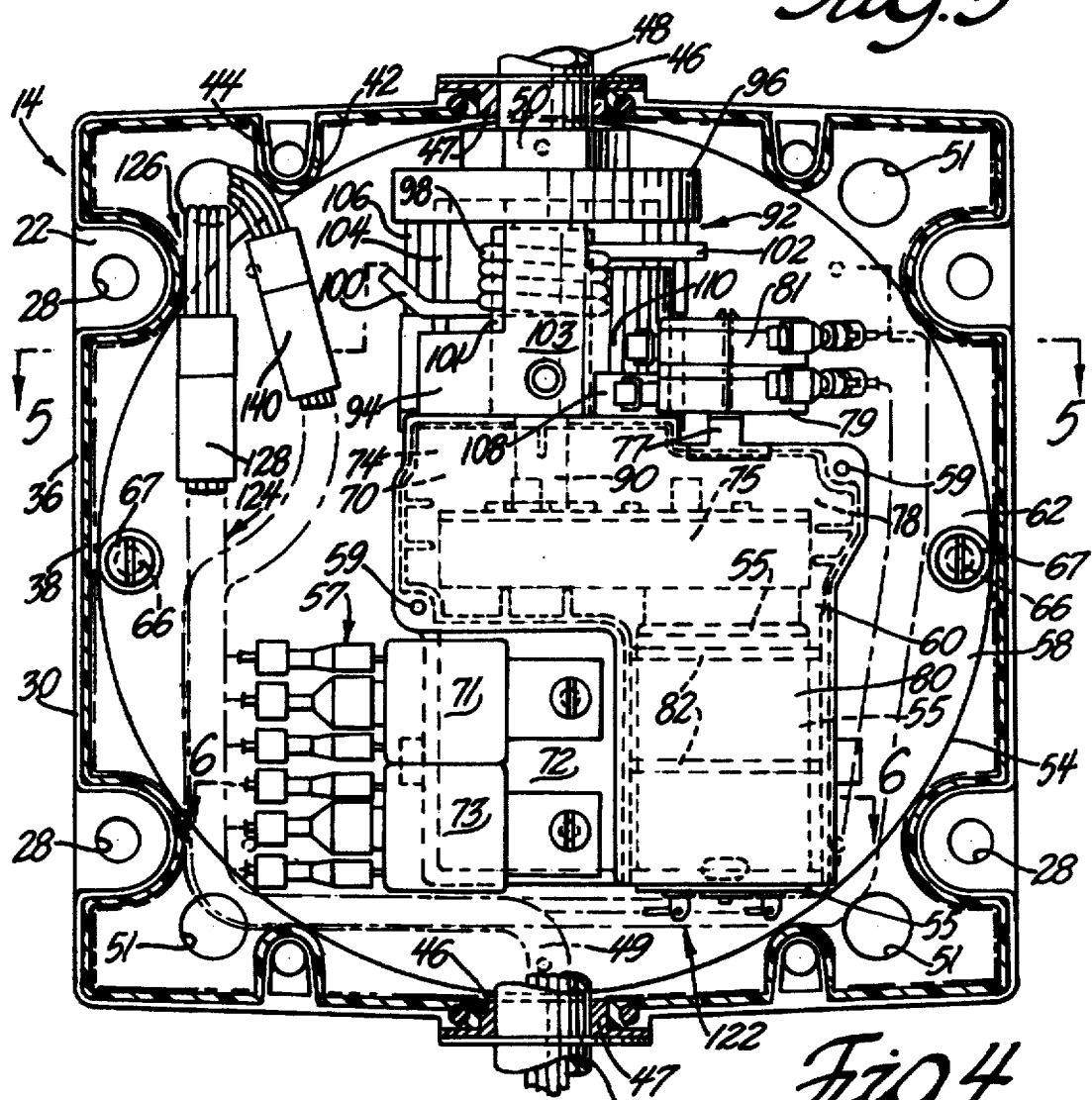
FIG. 4 is a section taken substantially along the line 4—4 of FIG. 3 looking in the direction of the arrows.

The lower portion of wall 103 of the input member 94 also includes two vertically spaced cams 108 and 110 for operating limit switches 79 and 81 that are attached to the inner subassembly 54 by threaded fasteners screwed into the bosses 77. The limit switches 79 and 81 are part of the motor control circuit 57 for the electric motor 55 which is shown schematically in FIG. 7. As indicated above, the motor control circuit 57 also includes relays 71 and 73 that are attached to the mounting pad 72 by metal clips as best shown in FIG. 4. The motor control circuit 57 further includes a wiring harness indicated generally at 122 in FIG. 4 that interconnects the electric motor 55, the limit switches 79 and 81 and the relays 71 and 73 by means of conventional electrical connectors to provide the motor control circuit 57 that is shown schematically in FIG. 7. These electrical components are all part of subassembly 54 so that the motor control circuit that is shown schematically in FIG. 7 except for the power source 130 and control switch 132 becomes part of the subassembly 54 when the wiring harness 122 is connected to these electrical components.

The wiring harness 122 comprises two sub-harnesses 124 and 126 that are connected together by a conventional plug and socket electrical connector 128 for convenient detachment. Sub-harness 124 provides the electrical circuit connections between the electrical components that are part of the sub-assembly 54. Sub-harness 126 is a pig-tail that leads out of the outer housing 20 and into the bus to connect to an electrical power source 130 and an control switch 132 inside the bus. The electrical connector 128 is provided so that the subassembly 54 can be detached and removed from the outer housing 20 after the pig-tail 126 is wired into the bus.

Power source 130 which powers the electric motor 55 is typically a 12 volt battery which powers other electrical devices on the bus. The electrical control circuit 57 is interposed between the power source 130 and the electric motor 55 for controlling the drive motor to selectively move the stop sign assembly 18 between the retracted and extended positions by operation of the control switch 132 inside the bus that is moved between a first position in which the electric motor 55 drives the stop sign assembly 18 from the retracted to the extended position and a second position in which the electric motor 55 drives the stop sign assembly 18 from the extended to the retracted position. The control switch 132 connects to the power source 130, each of the two relays 71, 73 and each of the two limit switches 79, 81.

The control circuit 57 de-activates the electric motor 55 when the stop sign 18 has reached either the extended or the retracted position by means of the two limit switches 79, 81 which as shown in FIGS. 3, 4 and 5 are placed adjacent the rotating input member 94 for operation by respective cam surfaces 108, 110 spaced apart vertically on the circumferential wall 103. Limit switches 79, 81 are opened and closed by engagement with their respective cam surfaces 108, 110 as input member 94 rotates through a ninety degree path, which is the distance between the retracted and extended positions. Basically one limit switch 79 stops the electric motor 55 when the stop sign assembly 18 is in the retracted position and the other limit switch 81 stops the electric motor 55 when the stop sign assembly 18 is in the extended position as explained below.

Relays 71, 73 reverse the direction of electrical current passing through the electric motor 55 when the control switch 132 is moved between the first and second positions. Each of the two relays 71, 73 includes a wire coil; a plunger that moves axially with respect to the wire coil when electrical current passes through the wire coils and a two position motor switch 134, 136 operated by the respective plungers. The first relay 71 operates a first motor switch 134 between a ground position and a first limit switch position associated with the first limit switch 79. The second relay 73 operates a second motor switch 136 between a second limit switch position associated with the second limit switch 81 and a ground position.

Figure 7:
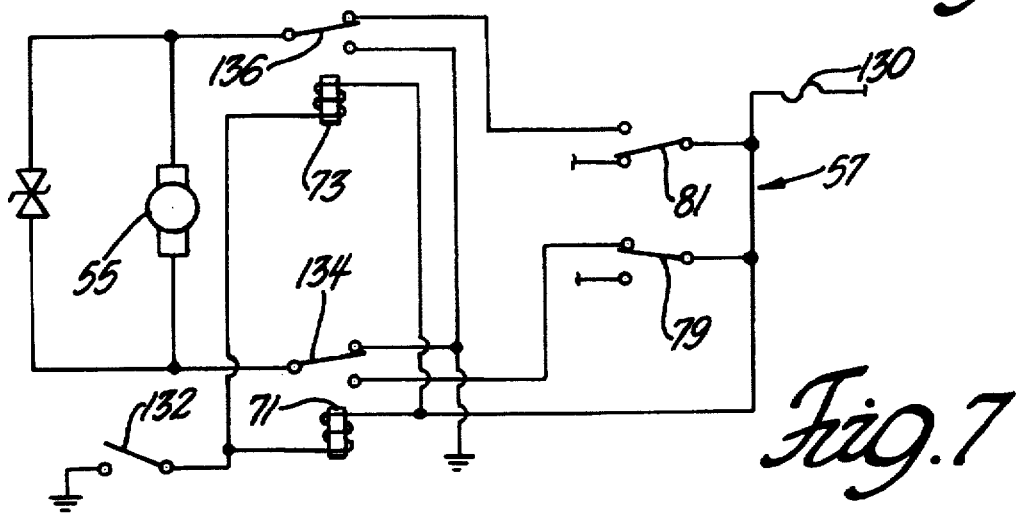
FIG. 7 is a schematic drawing of the motor control circuit for the electrical actuating assembly shown in FIGS. 1–6.

FIG. 7 shows the positions of the limit switches 79, 81; the motor switches 134, 136 and the control switch 132 when the stop sign assembly 18 is in the retracted position and the electric motor 55 is deenergized. In this case the first limit switch 79 is in the upper or power position and the second limit switch 81 is in the lower or non-power position.

To pivot the stop sign assembly 18 to the extended or operative position, the control switch 132 is moved to the first position (closed) and current flows from power source 130 through the motor control circuit 57 to ground to activate the relays 71, 73 which move the motor switches 134, 136 down from the positions shown in FIG. 7 to their respective lower connections. Current then also flows in a first direction across the electric motor 55 to ground, that is current flows from bottom to top across the electric motor 55 via limit switch 79 and motor switch 134 to electric motor 55 and from electric motor 55 through motor switch 136 to ground. As the input member 94 moves to the extended position, cam 110 moves the second limit switch 81 to the upper or power position to prepare for the return stroke. When the input member 94 rotates ninety degrees, thus moving the stop sign assembly 18 into the extended position, the first limit switch 79 is moved to the lower position by cam 108 thereby de-activating the electric motor 55. The relays 71, 73 meanwhile remain activated as long as the control switch 132 is in the first position (closed) so that the electric motor 55 is not activated via limit switch 81.

If the extended stop sign assembly 18 experiences any forces such as from another vehicle, a tree, a street sign, etc. that pivot the stop sign assembly 18, the arms 48 and the output member 96 also pivot so that the arcuate flange 106 of the output member 96 engages one leg 100 or 102 of the torsion spring 98 and rotates the spring until the other leg abuts the arcuate flange 104 of the input member 94. The input member 94, being attached to the electric motor 52 does not rotate unless a predetermined force is exceeded. The torsion spring 98 is designed to twist at a lower force and absorbs any force acting on the stop sign assembly 18 and prevents the input member 94 from rotating. When the force acting on the stop sign assembly 18 ceases, the torsion spring 98 forces the assembly 18 back into the extended position. The torsion spring 98 operates in a similar manner to allow continued operation of electric motor 55 when the stop sign assembly 18 hits an obstruction during deployment.

In order to return the stop sign assembly 18 to the retracted position, the control switch 130 is moved from the first to the second position (opened) which opens the circuits through the relays 71, 73 causing the motor switches 134, 136 to switch back to their upper connections as shown in FIG. 7. Current thus flows across the electric motor 55 in a second direction that is from top to bottom as shown in FIG. 7, the motor being fed via motor switches 81 and 136 and grounded via switch 134. As the input member 94 pivots back to the retracted position cam 108 raises the limit switch 79 to the upper or power position shown in FIG. 7 in preparation for the next stroke. When the input member 94 rotates the full ninety degrees to the retracted position the limit switch 81 is moved to the lower position shown in FIG. 7 by cam surface 110 which cuts off current flow to the electric motor 55 and deactivates it.

The entire stop sign mechanism 12 is attached to the side of the school bus 10 simply by fastening the electrical actuator assembly 14 to the body side panel 16 with four fasteners 26. The cover 24 of the outer housing 20 is then removed and one of the knock-outs 51 is punched out as shown in the upper left hand corner of FIG. 4. The four leads for the motor control circuit 57 are then routed from the outer housing 20 into the bus through the knock-out hole and sealed space 27 beneath the bottom wall 25 and attached to the power source 130 and control switch 132 inside the bus. The wiring harness 49 for illuminating the stop sign assembly 18 is also routed through the knock out hole and sealed space beneath the outer housing 20. Wiring harness 49 which is initially brought into the outer housing 20 through the one of the hollow L-shaped arms 48 is shown as being routed into the bus through the same knock out hole. However, another knock out hole can be used if desired. Moreover wiring harness 49 may also include a conventional plug and socket electrical connector 140 to facilitate removal after the wiring harness 49 is wired into an electrical power source and control inside the bus 10. The cover 24 is then reattached after the wiring harness 128 and 140 are routed into the bus 10. All of the mechanical and electrical components for pivoting the stop sign assembly 18 including the electric motor 55, motor control circuit 57 and the wiring harness 49 for illuminating the stop sign assembly 18 are now in a sealed outer housing 20 where these components are protected from adverse weather conditions and from vandalism. Moreover the electric motor 55 which is particularly susceptible to contaminant damage is further protected by an inner sealed housing that is part of a subassembly 54 that is easily removed for repair or replacement of the stop sign assembly and/or of the working parts of the actuator assembly.

While a hinged stop sign assembly of a particularly type been described, the invention is also applicable to other hinged vehicle safety devices such as a hinged crossing arm or safety gate 142 that can be attached to the front bumper panel of the bus 10 by an identical seal electrical actuator assembly 144 and which can be illuminated via a wiring harness that passes through the outer housing of the actuator assembly as described above. Crossing arms or safety gates are well known and described in my earlier patent that is discussed in the background of my invention. In other words, the invention has been described in an illustrative manner, and it is to be understood that the terminology which has been used is intended to be in the nature of words of description rather than of limitation.

Obviously, many modifications and variations of the present invention are possible in light of the above teachings may be made. It is, therefore, to be understood that, within the scope of the appended claims, the invention may be practiced otherwise than as specifically described.

I claim:

1. An electrical actuator assembly for attaching a hinged safety device to a body panel of a vehicle and pivoting the hinged safety device between retracted and extended positions comprising:

a sealed outer housing that has a base that is adapted for attachment to a body panel of a vehicle and a removable cover, an inner, removable subassembly inside the outer housing, the subassembly having a base member that is removeably attached to the base of the outer housing and a cover member that is removeably attached to the base member to form an inner housing, an electric motor disposed in the inner housing, a drive mechanism in the outer housing coupled to the electric motor for pivoting the safety device, and a motor control circuit in the outer housing including a wiring harness, the base having a hole for routing the wiring harness from the outer housing into a vehicle through a body panel without exposing the wiring harness.

2. The electrical actuator assembly as defined in claim 1 wherein the hole for routing the wiring harness is in a bottom wall of the base that is adapted for juxtaposition to a vehicle panel.

3. The electrical actuator assembly as defined in claim 1 wherein the hole for routing the wiring harness is in an elevated bottom wall of the base that provides a sealed pass-through space beneath the elevated bottom wall when the base is attached to a body panel of a vehicle.

4. The electrical actuator assembly as defined in claim 1 wherein the motor control circuit includes limit switches for deactivating the electric motor at each end of a predetermined stroke and motor switches for reversing the direction of current flow through the electric motor to provide an extension stroke and a return stroke, the limit switches and the motor switches being part of the removable subassembly.

5. An electrical actuator assembly for attaching a hinged safety device to a body panel of a vehicle and pivoting the hinged safety device between retracted and extended positions comprising:

a sealed outer housing that has a base that is adapted for attachment to a body panel of a vehicle and a removable cover, an inner, removable subassembly inside the outer housing, the subassembly having a base member that is removably attached to the base of the outer housing and a cover member that is removably attached to the base member to form an inner housing, an electric motor disposed in the inner housing, a drive mechanism in the outer housing coupled to the electric motor for pivoting the safety device, and a motor control circuit in the outer housing including a wiring harness, the base having a hole for routing the wiring harness from the outer housing into a vehicle through a body panel without exposing the wiring harness, and the base having semi-circular cradles and the cover having complementary semi-circular caps for journalling pivot arms of a hinged safety device when the cover is attached to the base so that the hinged safety device is removable along with the subassembly when the cover is detached from the base.

6. An electrical actuator assembly for attaching a hinged safety device to a body panel of a vehicle and pivoting the hinged safety device between retracted and extended positions comprising:

a sealed outer housing that has a base that is adapted for attachment to a body panel of a vehicle and a removable cover, an inner, removable subassembly inside the outer housing, the subassembly having a base member that is removable attached to the base of the outer housing and a cover member that is removable attached to the base member to form an inner housing, an electric motor disposed in the inner housing, a drive mechanism in the outer housing coupled to the electric motor for pivoting the safety device, and a motor control circuit in the outer housing including a wiring harness, the base having a hole for routing the wiring harness from the outer housing into a vehicle through a body panel without exposing the wiring harness, and at least one pivot arm for a hinged safety device that is journaled in a wall of the outer housing and that is hollow for routing a second wiring harness into the outer housing.

7. An electrical actuator assembly for attaching a hinged safety device to a body panel of a vehicle and pivoting the hinged safety device between retracted and extended positions comprising:

a sealed outer housing that has a base that is adapted for attachment to a body panel of a vehicle and a removable cover, an inner, removable subassembly inside the outer housing, the subassembly including a drive mechanism for pivoting the safety device, an electric motor coupled to the drive mechanism, and a motor control circuit including a wiring harness, limit switches for deactivating the electric motor at each end of a predetermined stroke and motor switches reversing the direction of current flow through the electric motor, to provide an extension stroke and a return stroke, the limit switches and the motor switches being interconnected by the wiring harness, the base having a hole for routing the wiring harness from the outer housing into the vehicle through the body panel without exposing the wiring harness, the wiring harness including an electrical connector for detaching a pig tail subharness from a remainder of the wiring harness that interconnects the limit switches and the motor switches, and the hole for routing the wiring harness being in an elevated bottom wall of the base that provides a sealed pass-through space beneath the elevated bottom wall when the base is attached to a vehicle panel.

8. An electrical actuator assembly for attaching a hinged safety device to a body panel of a vehicle and pivoting the hinged safety device between retracted and extended positions comprising:

a sealed outer housing that has a base that is adapted for attachment to a body panel of a vehicle and a removable cover, an inner, removable subassembly inside the outer housing, the subassembly including a drive mechanism for pivoting the safety device, an electric motor coupled to the drive mechanism, and a motor control circuit including a wiring harness, the base having a hole for routing the wiring harness from the outer housing into the vehicle through the body panel without exposing the wiring harness, and the base having semi-circular cradles and the cover having complementary semi-circular caps for journalling pivot arms of a hinged safety device when the cover is attached to the base so that the hinged safety device is removable along with the subassembly when the cover is detached from the base.

9. An electrical actuator assembly for attaching a hinged safety device to a body panel of a vehicle and pivoting the hinged safety device between retracted and extended positions comprising:

a sealed outer housing that has a base that is adapted for attachment to a body panel of a vehicle and a removable cover, an inner, removable subassembly inside the outer housing, the subassembly including a drive mechanism for pivoting the safety device, an electric motor coupled to the drive mechanism, and a motor control circuit including a wiring harness, the base having a hole for routing the wiring harness from the outer housing into the vehicle through the body panel without exposing the wiring harness, and at least one pivot arm for a hinged safety device that is journalled in a wall of the outer housing and that is hollow for routing a second wiring harness into the outer housing and outer through the same or another hole in the base.

10. An electrical actuator assembly for pivoting a hinged safety device attached to a vehicle between retracted and extended positions comprising:

a sealed outer housing that has a base that is adapted for attachment to a body panel of the vehicle and a removable cover, an inner, removable subassembly inside the outer housing having an inner housing comprising a base member that is removeably attached to the base of the outer housing, and a removable cover member, the subassembly including a drive mechanism for pivoting the safety device, an electric motor disposed in the inner housing and coupled to the drive mechanism, and a motor control circuit including limit switches, relays and motor switches that are mounted on the inner housing and a wiring harness, the wiring harness having an electrical connector for detaching a pig tail portion from a remainder of the wiring harness that interconnects the limit switches, the relays and the motor switches electrically, and the base of the outer housing having a hole for routing the pig tail portion of the wiring harness into the vehicle through a body panel to which the electrical actuator assembly is attached.

11. An electrical actuator assembly for pivoting a hinged safety device attached to a vehicle between retracted and extended positions comprising:

a sealed outer housing that has a base that is adapted for attachment to a body panel of the vehicle and a removable cover, an inner, removable subassembly inside the outer housing having an inner housing comprising a base member that is removeably attached to the base of the outer housing, and a removable cover member, the subassembly including a drive mechanism for pivoting the safety device, an electric motor disposed in the inner housing and coupled to the drive mechanism, a motor control circuit including limit switches, relays and motor switches that are mounted on the inner housing and a wiring harness, the wiring harness having an electrical connector for detaching a pig tail portion from a remainder of the wiring harness that interconnects the limit switches, the relays and the motor switches electrically, the base of the outer housing having a hole for routing the pig tail portion of the wiring harness into the vehicle through a body panel to which the electrical actuator assembly is attached, the base having semi-circular cradles and the cover having complementary semi-circular caps for journalling pivot arms of a hinged safety device when the cover is attached to the base so that the hinged safety device is removable along with the subassembly when the cover is detached from the base.

12. An electrical actuator assembly for pivoting a hinged safety device attached to a vehicle between retracted and extended positions comprising:

a sealed outer housing that has a base that is adapted for attachment to a body panel of the vehicle and a removable cover, an inner, removable subassembly inside the outer housing having an inner housing comprising a base member that is removably attached to the base of the outer housing, and a removable cover member, the subassembly including a drive mechanism for pivoting the safety device, an electric motor disposed in the inner housing and coupled to the drive mechanism, a motor control circuit including limit switches, relays and motor switches that are mounted on the inner housing and a wiring harness, the wiring harness having an electrical connector for detaching a pig tail portion from a remainder of the wiring harness that interconnects the limit switches, the relays and the motor switches electrically, the base of the outer housing having a hole for routing the pig tail portion of the wiring harness into the vehicle through a body panel to which the electrical actuator assembly is attached, and at least one pivot arm for a hinged safety device that is journalled in a wall of the outer housing and that is hollow for ROuting a second wiring harness into the outer housing.

13. The electrical actuator assembly as defined in claim 11 wherein at least one pivot arm is hollow for routing a second wiring harness into the outer housing.

14. An electrical actuator assembly for pivoting a hinged safety device attached to a vehicle between retracted and extended positions comprising:

a sealed outer housing that has a base that is adapted for attachment to a body panel of the vehicle and a removable cover, an inner, removable subassembly inside the outer housing including a drive mechanism for pivoting the safety device, an electric motor coupled to the drive mechanism, and a motor control circuit including limit switches, relays and motor switches that are part of the subassembly;

a wiring harness having an electrical connector for detaching a pig tail portion from a remainder of the wiring harness that is part of the subassembly;

the base of the outer housing having a hole for routing the pig tail portion of the wiring harness into the vehicle through a body panel to which the electrical actuator assembly is attached, the base having semi-circular cradles; and the cover having complementary semi-circular caps for journalling pivot arms of a hinged safety device when the cover is attached to the base so that the hinged safety device is removable along with the subassembly when the cover is detached from the base.

15. The electrical actuator assembly as defined in claim 14 wherein at least one pivot arm is hollow for routing a second wiring harness into the outer housing.

16. An electrical actuator assembly for pivoting a hinged safety device attached to a vehicle between retracted and extended positions comprising:

a sealed outer housing that has a base that is adapted for attachment to a body panel of the vehicle and a removable cover, an inner, removable subassembly inside the outer housing including a drive mechanism for pivoting the safety device, an electric motor coupled to the drive mechanism, and a motor control circuit including limit switches, relays and motor switches that are mounted on the inner housing;

a wiring harness having an electrical connector for detaching a pig tail portion from a remainder of the wiring harness that is part of the base of the outer housing having a hole for routing the pig tail portion of the wiring harness into the vehicle through a body panel to which the electrical actuator assembly is attached, and at least one pivot point arm for a hinged safety device that is journalled in a wall of the outer housing and that is hollow for routing a second wiring harness into the outer housing.

17. An electrical actuator assembly for pivoting a hinged safety device attached to a vehicle between retracted and extended positions comprising:

a sealed outer housing that has a base that is adapted for attachment to a body panel of the vehicle and a removable cover, an inner, removable subassembly inside the outer housing including a drive mechanism for pivoting the safety device, an electric motor coupled to the drive mechanism, and a motor control circuit including limit switches, relays and motor switches that are part of the subassembly;

the base having semi-circular cradles; and the cover having complementary semi-circular caps for journalling pivot arms of a hinged safety device when the cover is attached to the base so that the hinged safety device is removable along with the subassembly when the cover is detached from the base.

* * * * *